(12) United States Patent
Park

(10) Patent No.: US 12,499,625 B2
(45) Date of Patent: Dec. 16, 2025

(54) VR-BASED TOUR ROUTE PROVIDING APPARATUS

(71) Applicant: AKP Inc., Sejong-si (KR)

(72) Inventor: Dae Hyeon Park, Seoul (KR)

(73) Assignee: AKP Inc., Sejong-si (KR)

( * ) Notice: Subject to any disclaimer, the term of this patent is extended or adjusted under 35 U.S.C. 154(b) by 139 days.

(21) Appl. No.: 18/411,063

(22) Filed: Jan. 12, 2024

(65) Prior Publication Data

US 2025/0166310 A1  May 22, 2025

(30) Foreign Application Priority Data

Nov. 22, 2023 (KR) ........................ 10-2023-0163289

(51) Int. Cl.
| | |
|---|---|
| *G06T 19/00* | (2011.01) |
| *G06Q 30/0251* | (2023.01) |
| *G06Q 50/14* | (2012.01) |
| *G10L 15/16* | (2006.01) |

(52) U.S. Cl.
CPC ....... *G06T 19/003* (2013.01); *G06Q 30/0271* (2013.01); *G06Q 50/14* (2013.01); *G06T 19/006* (2013.01); *G10L 15/16* (2013.01)

(58) Field of Classification Search
None
See application file for complete search history.

(56) References Cited

U.S. PATENT DOCUMENTS

| | | | | |
|---|---|---|---|---|
| 10,558,042 B2 * | 2/2020 | Wieczorek | ............... | A63F 13/26 |
| 10,984,596 B2 * | 4/2021 | Yang | ........................ | G06T 15/20 |
| 2004/0097226 A1 * | 5/2004 | Hull | ........................ | H04W 4/38 |
| | | | | 455/554.1 |
| 2005/0120200 A1 * | 6/2005 | Brignone | ................ | G06F 16/95 |
| | | | | 707/E17.107 |
| 2005/0240970 A1 * | 10/2005 | Schwalb | ................... | H04N 7/18 |
| | | | | 725/74 |
| 2010/0030578 A1 * | 2/2010 | Siddique | ................ | G06Q 20/12 |
| | | | | 705/26.1 |
| 2015/0127486 A1 * | 5/2015 | Advani | .............. | G06Q 30/0241 |
| | | | | 705/26.41 |
| 2016/0035224 A1 * | 2/2016 | Yang | ....................... | G08G 5/723 |
| | | | | 701/23 |
| 2016/0260252 A1 * | 9/2016 | Kim | ........................ | G06F 3/017 |
| 2016/0300392 A1 * | 10/2016 | Jonczyk | ................. | G06T 19/003 |
| 2017/0243403 A1 * | 8/2017 | Daniels | ................. | G06F 3/1454 |
| 2017/0329329 A1 * | 11/2017 | Kamhi | .............. | B60W 50/0098 |
| 2019/0139321 A1 * | 5/2019 | Kocharlakota | ......... | G06F 3/011 |

(Continued)

FOREIGN PATENT DOCUMENTS

| | | |
|---|---|---|
| KR | 10-2018-0042968 A | 4/2018 |
| KR | 10-2020-0075151 A | 6/2020 |

(Continued)

*Primary Examiner* — Hilina K Demeter

(74) *Attorney, Agent, or Firm* — Revolution IP, PLLC

(57) ABSTRACT

A virtual reality (VR)-based tour route providing apparatus, which creates a tour route of a corresponding tourism area through a VR experience in which a tourism area of users is implemented according to one embodiment of the present invention, includes an area information receiver, a zone information receiver, a VR data generator, a tracking data generator, a zone visit information generator, a zone-of-interest selection unit, and a tour route information generator.

6 Claims, 4 Drawing Sheets

(56) References Cited

U.S. PATENT DOCUMENTS

| | | | | |
|---|---|---|---|---|
| 2021/0097893 A1* | 4/2021 | Klappert | ............. | G06F 16/9024 |
| 2022/0108530 A1* | 4/2022 | Yang | ....................... | G06F 3/165 |
| 2022/0358687 A1* | 11/2022 | Lenke | ................... | G06T 19/006 |
| 2023/0410014 A1* | 12/2023 | Nomoto | ............. | G06Q 10/0637 |
| 2024/0200967 A1* | 6/2024 | Arroyo | ............. | G01C 21/3676 |

FOREIGN PATENT DOCUMENTS

| | | |
|---|---|---|
| KR | 10-2020-0132583 A | 11/2020 |
| KR | 10-2021-0065773 A | 6/2021 |
| KR | 10-2479974 B1 | 12/2022 |
| KR | 10-2023-0003755 A | 1/2023 |
| KR | 10-2023-0046481 A | 4/2023 |
| KR | 10-2023-0112390 A | 7/2023 |

\* cited by examiner

VR-BASED TOUR ROUTE PROVIDING APPARATUS

CROSS-REFERENCE TO RELATED APPLICATION

This application claims priority to and the benefit of Korean Patent Application No. 10-2023-0163289, filed on Nov. 22, 2023, the disclosure of which is incorporated herein by reference in its entirety.

BACKGROUND

1. Field of the Invention

The present invention relates to a virtual reality (VR)-based tour route providing apparatus, and more specifically, to a VR-based tour route providing apparatus which tracks a movement route of users using VR and creates a tour route of a corresponding area based on the movement route.

2. Discussion of Related Art

After the end of COVID-19, demand in the global tourism market is rapidly recovering. In addition, industries using virtual spaces such as a Metaverse are growing rapidly. These two developing industries are growing in a mutually combined form. For example, there are pieces of content in which a corresponding tourism area is implemented as an ultra-high resolution three-dimensional (3D) image, and users experience the ultra-high resolution 3D image through virtual reality (VR). Through such pieces of content, users can indirectly experience a tour in a corresponding area through VR without actually visiting a corresponding tourism area. In the present specification, a VR-based tour route providing apparatus will be described which collects data about a VR experience in such a tourism area, and when the corresponding tourism area is actually toured on the basis of the collected data, generates a tour route.

RELATED ART DOCUMENTS

Korea Patent Registration No. 10-2479974

SUMMARY OF THE INVENTION

The present invention relates to a virtual reality (VR)-based tour route providing apparatus, and more specifically, to a VR-based tour route providing apparatus which tracks a movement route of users using VR and generates a tour route of a corresponding area based on the movement route.

According to an aspect of the present invention, there is provided a VR-based tour route providing apparatus for creating a tour route of a corresponding tourism area through a VR experience in which a tourism area of users is implemented, the VR-based tour route providing apparatus includes an area information receiver configured to receive area information including photo and image data of a tourism area in real time from an area server operated in the tourism area, a zone information receiver configured to receive zone information including range information of tourism zones included in the tourism area in real time from the area server, a VR data generator configured to generate VR data in which the tourism area is implemented in VR based on the area information and the zone information, a tracking data generator configured to generate and store tracking data in which a route, through which users travel, is tracked over time while the users experience a tour using VR data of the tourism area generated through VR equipment, a zone visit information generator configured to analyze the collected tracking data to calculate the number of visits by the users to the tourism zone and a tour time in the tourism zone and generate tourism zone visit information matching the tourism zone through the number of visits and the tour time, a zone-of-interest selection unit configured to calculate the number of times, by which the user takes a tour for a set time or more for each zone, based on the tourism zone visit information and select a zone, in which the calculated number of times is greater than or equal to a set number of times, as a zone of interest, and a tour route information generator configured to set a route of a tourism course in the tourism area based on the selected zone of interest and generate tour route information to transmit the generated tour route information to a corresponding tourism area server, wherein, since the zone information and the area information received in real time change, the VR data generator updates the VR data in real time by reflecting changed corresponding information.

The VR-based tour route providing apparatus may further include an average tour time calculation unit configured to calculate an average tour time of the users through VR for each tourism zone based on the tourism zone visit information, and a request time information receiver configured to receive request time information including information about an execution time in a tour route requested in the tourism area from the area server, wherein the tour route information generator includes a zone-of-interest grouping unit configured to set a group of interest by combining and grouping selected zones of interest such that a sum of calculated average tour times for each of the selected zones of interest is within a set range of a request time included in the request time information, and a route creation unit configured to create a tour route by connecting adjacent zones of interest among the grouped zones of interest.

The VR-based tour route providing apparatus may further include a tag information receiver configured to receive tag information for representing characteristics of the tourism zone in the form of a hash tag in real time from a staff terminal used by a staff member in the tourism zone, a first tourism zone extractor configured to extract a tourism zone, in which the average calculation time is greater than or equal to a set time, as a first tourism zone, a second tourism zone extractor configured to extract a tourism zone, in which the average calculation time is less than the set time, as a second tourism zone, a supplementary information generator configured to analyze pieces of tag information corresponding to the first tourism zone and pieces of tag information corresponding to the second tourism zone and generate tag information, which is not present in the tag information corresponding to the second tourism zone among the pieces of tag information corresponding to the first tourism zone, as supplementary information to transmit the supplementary information to a staff terminal of a staff member in charge of the second tourism zone, and a reference information generator configured to analyze the tag information corresponding to the first tourism zone and the tag information corresponding to the second tourism zone and generate tag information, which is not present in the tag information corresponding to the first tourism zone among the pieces of tag information corresponding to the second tourism zone, as reference information to transmit the reference information to a staff terminal of a staff member in charge of all the tourism zones.

The VR-based tour route providing apparatus may further include a voice data collection unit configured to collect voice data of the users over time while the users experience a tour using the VR data of the tourism area generated through the VR equipment, a voice data classification unit configured to classify the voice data according to the tourism zone by matching the voice data with the tracking data over time, a sentence analysis unit configured to divide the voice data classified according to the tourism zone into units of sentences and analyze the divided sentences to classify the sentences into positive sentences, negative sentences, and general sentences, and a tourism zone setting unit configured to calculate a positive ratio and a negative ratio of the voice data classified according to the tourism zone based on results analyzed by the sentence analysis unit, set a tourism zone, which includes voice data of which the positive ratio is greater than or equal to a set ratio, as a positive response tourism zone, and set a tourism zone, which includes voice data of which the negative ratio is greater than or equal to a set ratio, as a negative response tourism zone, wherein the tour route information generator further includes a recommended route determination unit configured to allocate recommendation scores to remaining groups of interest, which are left by excluding a group including the negative response tourism zone from groups of interest, in order of the larger number of positive response tourism zones, and determine a tour route, which is created from a group with a recommendation score greater than or equal to a set score, as a recommended route, and the tour route information generator transmits information about the determined recommended route to the tourism area server.

The VR-based tour route providing apparatus may further include a sentence data collection unit configured to receive positive sentence data and negative sentence data from a manager terminal and store the positive sentence data and the negative sentence data, wherein the sentence analysis unit transmits the classified sentences to the manager terminal, a manager checks the classified sentences through the manager terminal and then reclassifies the classified sentences, the sentence data collection unit receives reclassified positive sentence data and reclassified negative sentence data, and the sentence analysis unit learns the positive sentence data and the negative sentence data stored in the sentence data collection unit and classifies sentences into positive sentences, negative sentences, and general sentences based on a learning result.

The VR-based tour route providing apparatus may further include an opinion exchange server generator configured to, when the negative response tourism zone is included in the group of interest, generate an opinion exchange server configured to extract a tourism zone adjacent to the negative response tourism zone from the group of interest and connect a staff account of the negative response tourism zone and a staff account of the extracted adjacent tourism zone to allow opinions to be exchanged, wherein the opinion exchange server generator transmits voice data corresponding to the negative response tourism zone to the generated opinion exchange server.

The VR-based tour route providing apparatus may further include a promotional article data generator configured to extract sentences classified to be positive from the voice data corresponding to the tourism zone, generate promotional article data through an article generation model using artificial intelligence based on the extracted sentences, and transmit the generated promotional article data to a staff terminal of the tourism zone, wherein the tour route information generator further includes a headline matching unit configured to extract a headline of promotional articles generated by the promotional article data generator and match the headline with a tourism zone included in the generated tour route information, and the tour route information generator transmits the tour route information, which includes the tourism zone with which the headline matches, to the tourism area server.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
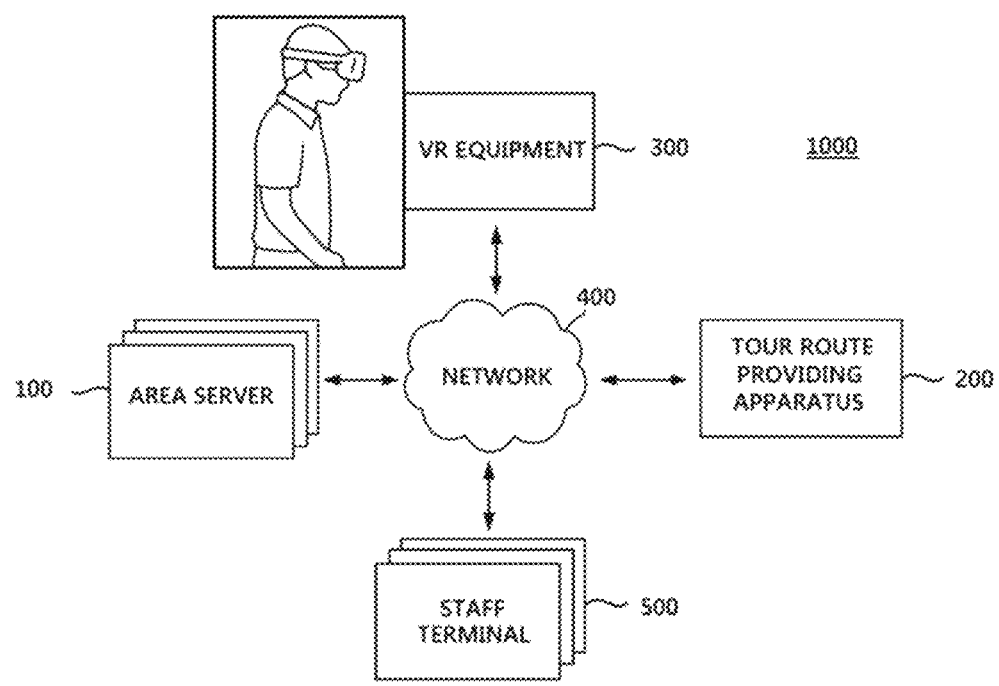
FIG. 1 is a schematic diagram of a tour route generating system according to one embodiment of the present invention.

Hereinafter, embodiments of the present invention will be described in detail with reference to the accompanying drawings so that those skilled in the art can carry out the present invention. However, the present invention may be implemented in various forms and is not limited to the embodiments described herein. In order to clearly explain the present invention in the drawings, parts not related to the description are omitted, and similar parts are given similar reference numerals throughout the specification.

Throughout the specification, it will be understood that when an element is referred to as being "coupled" or "connected" to another element, it can be directly coupled or electrically connected to the other element or intervening elements may be present therebetween. In addition, throughout the specification, unless explicitly described to the contrary, the word "comprise" and variations such as "comprises" or "comprising" will be understood to imply the inclusion of stated elements but not the exclusion of any other elements. Hereinafter, the present invention will be described in detail with reference to the accompanying drawings.

FIG. 1 is a schematic diagram of a tour route generating system 1000 according to one embodiment of the present invention.

Referring to FIG. 1, the tour route generating system 1000 according to one embodiment of the present invention may include an area server 100, a staff terminal 500, virtual reality (VR) equipment 300, and a tour route providing apparatus 200 connected to the VR equipment 300 through a network 400.

The area server 100 may be a server operated by a local government that oversees a tourism industry in a corresponding area. The corresponding local government may be a public institution operated by the national government.

The area server 100 may be a typical desktop computer. However, the present invention is not limited thereto, and the area server 100 may include an electronic device such as a laptop computer, a digital broadcasting terminal, a personal digital assistant (PDA), a portable multimedia player (PMP), or a tablet personnel computer (PC). The electronic device may include one or more general or special purpose processors, a memory, a storage, and/or a (wired or wireless) networking component.

The staff terminal 500 may be a terminal used by a staff member in charge of managing each of zones belonging to a tourism area. The staff terminal 500 may be a terminal used by a staff member in charge of tourism work in a specific zone of a tourism area.

The staff terminal 500 may be a smartphone. However, the present invention is not limited thereto, and the staff terminal 500 may include an electronic device such as a typical desktop computer, a laptop computer, a digital broadcasting terminal, a PDA, a PMP, or a tablet PC. The electronic device may include one or more general or special purpose processors, a memory, a storage, and/or a (wired or wireless) networking component.

The VR equipment 300 may be equipment used by users who experience a space implemented in VR by three-dimensional (3D)-mapping a tourism area. For example, as shown in FIG. 1, a user may move and experience a tourism area that is 3D-mapped and implemented as a virtual space through the VR equipment 300.

The tour route providing apparatus 200 may receive data from the area server 100 and may process the received data to generate VR data that may be used for a VR experience, and when a user has an experience according to the corresponding VR data, the tour route providing apparatus 200 may process result data about the experience to generate tour route information. The tour route providing apparatus 200 may be a server. According to the present invention, a tour route can be created based on VR in which a corresponding tourism area is generated through VR experiences in which a tourism area for users is implemented.

Figure 3:
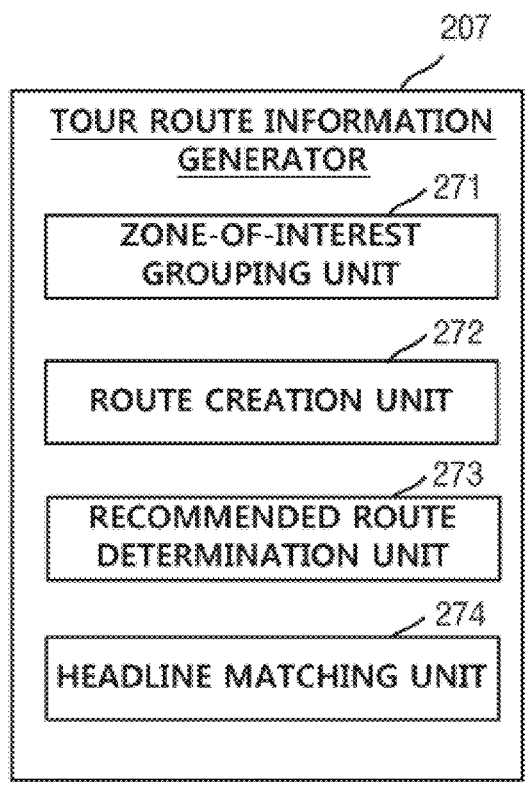
FIG. 3 is a block diagram of a tour route information generator according to one embodiment of the present invention.
Figure 4:
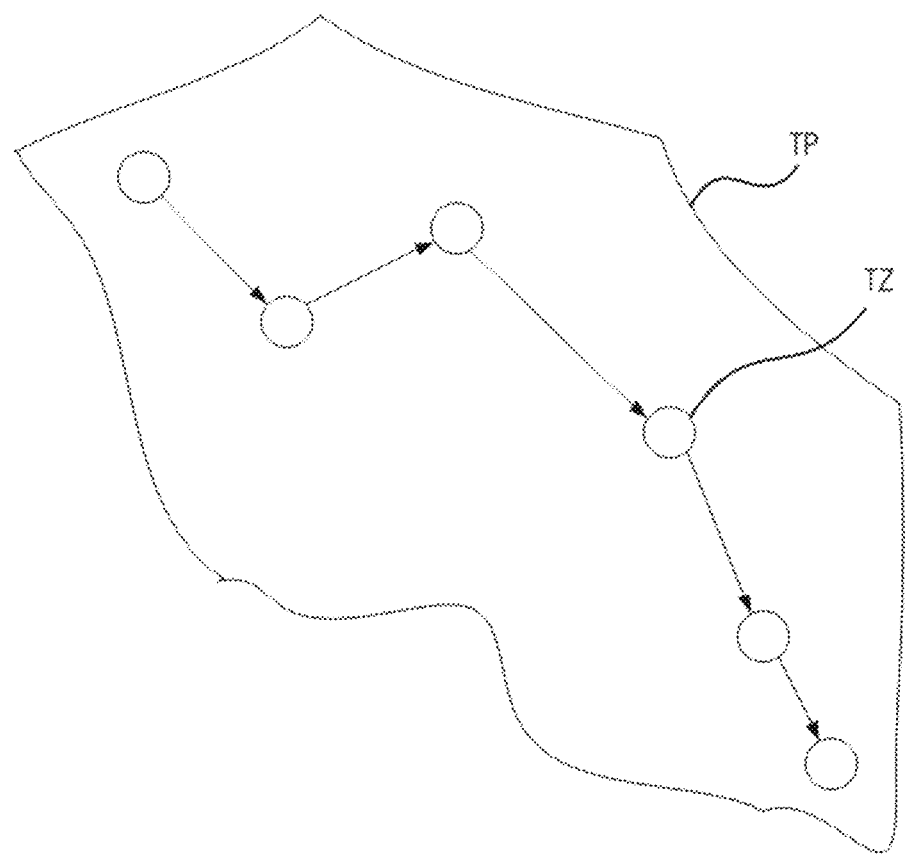
FIG. 4 is a diagram for describing a process of creating a tour route in the present invention.

The tour route providing apparatus 200 will be described in more detail with reference to FIGS. 2 to 4.

A communication method of the network 400 is not limited. The communication method may include a communication method using a communication network that may be included in the network 400 (for example, a mobile communication network, a wired online network, a wireless online network, or a broadcasting network) and may also include short-range wireless communication between devices. For example, the network 400 may include at least one network 400 among plural networks 400 such as a personal area network (PAN), a local area network (LAN), a campus area network (CAN), a metropolitan area network (MAN), a wide area network (WAN), and a broadband network (BBN), and an online network.

Figure 2:
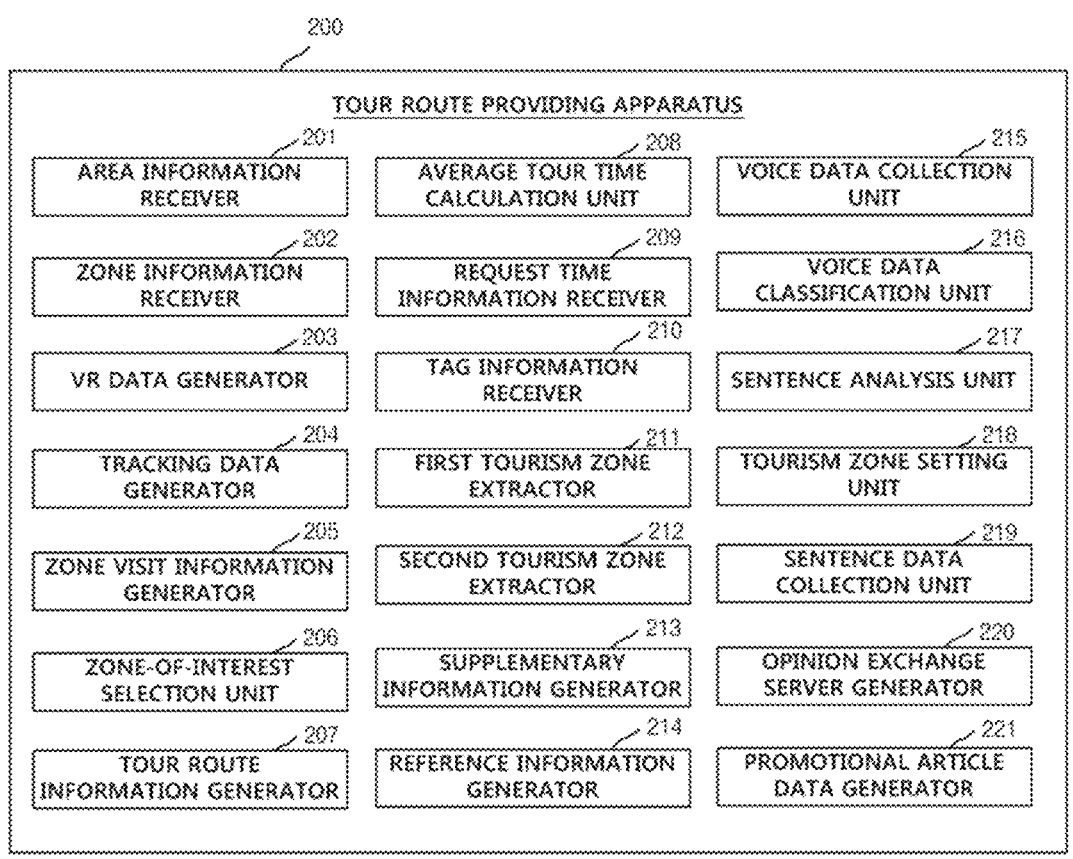
FIG. 2 is a block diagram of a tour route providing apparatus according to one embodiment of the present invention.

FIG. 2 is a block diagram of a tour route providing apparatus 200 according to one embodiment of the present invention. FIG. 3 is a block diagram of a tour route information generator 207 according to one embodiment of the present invention. FIG. 4 is a diagram for describing a process of creating a tour route in the present invention.

Referring to FIG. 2, the tour route providing apparatus 200 according to one embodiment of the present invention may include an area information receiver 201, a zone information receiver 202, a VR data generator 203, a tracking data generator 204, a zone visit information generator 205, a zone-of-interest selection unit 206, and a tour route information generator 207.

The area information receiver 201 may receive area information including photo and image data of a tourism area in real time from an area server 100, and the zone information receiver 202 may receive zone information including range information of tourism zones included in the tourism area in real time.

The area information may be information that includes street images and photo images of a tourism area, the zone information may include coordinate information of a tourism zone included in the corresponding tourism area, and a part of the tourism area to which a specific tourism zone belongs may be grasped according to the corresponding coordinate information.

The VR data generator 203 may generate VR data in which the corresponding tourism area is implemented in VR based on the zone information and the area information.

Specifically, based on the VR data, a virtual space (metaverse space) may be implemented to be close to an actual space by 3D-mapping photo and image data included in the area information. A space corresponding to each tourism zone may be set in a virtual space implemented based on the zone information.

Since the zone information and the area information received in real time change, the VR data generator 203 may update the VR data in real time by reflecting the changed information.

While users experience a tour using VR data of a tourism area generated through VR equipment 300, the tracking data generator 204 may generate and store tracking data in which a route, through which the users travel, is tracked over time. Specifically, in a process in which users have a virtual experience of a tourism area through the VR equipment 300, the tracking data generator 204 may track at which position the users are positioned in the tourism area at a specific time, thereby generating tracking data including information about a movement route of the users over time.

The zone visit information generator 205 may analyze the collected tracking data to calculate the number of visits by users to a tourism zone and a tour time in the corresponding tourism zone and may generate tourism zone visit information matching the corresponding tourism zone through the number of visits and the tour time.

When a user enters a specific tourism zone while experiencing a virtual space through VR, the zone visit information generator 205 may count the number of visits to the corresponding tourism zone, may check a time spent in the corresponding tourism zone, and may calculate a tour time to generate tourism zone visit information.

The zone-of-interest selection unit 206 may calculate the number of times, by which a user takes a tour for a set time or more for each zone, based on the tourism zone visit information and may select a zone, in which the calculated number of times is greater than or equal to a set number of times, as a zone of interest. The number of visits to a tourism zone may be calculated based on the tracking data, and when there is a tourism zone in which the number of visits is greater than or equal to a set number, it may be regarded that a user's interest in the corresponding tourism zone is high, and thus the zone-of-interest selection unit 206 may select the corresponding zone as a zone of interest.

The tour route information generator 207 may set a route of a tourism course of a tourism area TP based on a selected zone of interest TZ and may generate tour route information to transmit the generated tour route information to the corresponding tourism area server 100.

Hereinafter, the tour route information generator 207 will be described in more detail.

The tour route providing apparatus 200 of the present invention may further include an average tour time calculation unit 208 and a request time information receiver 209.

The average tour time calculation unit 208 may calculate an average tour time of users through VR for each tourism zone based on tourism zone visit information. Since the tourism zone visit information includes a time for which users tour the tourism zone TZ, the average tour time calculation unit 208 may calculate an average tour time of the users for the tourism zone based on the time.

The request time information receiver 209 may receive request time information including information about an execution time in a tour route requested in the corresponding tourism area TP from the area server 100. In the tourism area, there may be a desired time required to produce a travel program including a movement route through which the tourism area TP thereof is toured and perform the corresponding travel program. The request time information receiver 209 may reflect such a point to receive request time information including information about a time taken to complete a tour route desired in the tourism area TP, that is, a desired time required to move the tour route.

The tour route information generator 207 may include a zone-of-interest grouping unit 271 and a route creation unit 272.

The zone-of-interest grouping unit 271 may set a group of interest by combining and grouping selected zones of interest TZ such that the sum of calculated average tour times for each of the selected zones of interest TZ is within a set range of a request time included in the request time information. For example, when a time included in the request time information is 1 hour, a setting range is 10 minutes, an average tour time in zone A is 20 minutes, an average tour time in zone B is 20 minutes, and an average tour time in zone C is 25 minutes, the sum of the average tour times in zones A, B, and C is 65 minutes, which is within 10 minutes from a request time of 1 hour. Zones A, B, and C may be grouped to set a group of interest.

The route creation unit 272 may create a tour route by connecting adjacent zones of interest among the grouped zones of interest TZ. For example, as shown in FIG. 4, when six zones TZ of the tourism area TP are grouped and generated into a group of interest, the route creation unit 272 may create a tour route by connecting adjacent zones.

The tour route information generator 207 may generate tour route information including a tour route created in this way and may transmit the generated tour route information to the corresponding tourism area server 100.

The tour route providing apparatus 200 of the present invention may further include a tag information receiver 210, a first tourism zone extractor 211, a second tourism zone extractor 212, a supplementary information generator 213, and a reference information generator 214.

The tag information receiver 210 may receive tag information for representing the characteristics of the corresponding tourism zone TZ in the form of a hash tag from a staff terminal 500 in real time. The corresponding tag information may be composed of words that may well reflect the characteristic parts of the corresponding tourism zone, and may be expressed, for example, as "#spaghetti."

The first tourism zone extractor 211 may extract a tourism zone, in which an average calculation time is greater than or equal to a set time, as a first tourism zone, and the second tourism zone extractor 212 may extract a tourism zone, in which an average calculation time is less than the set time, as a second tourism zone.

The supplementary information generator 213 may analyze pieces of tag information corresponding to the first tourism zone and pieces of tag information corresponding to the second tourism zone and may generate tag information, which is not present in the tag information corresponding to the second tourism zone among the pieces of tag information corresponding to the first tourism zone, as supplementary information to transmit the supplementary information to the staff terminal 500.

The second tourism zone may be a tourism zone in which an average tour time of users who experience VR data is short and may be a zone in which the users have a low degree of interest in a tour. When the supplementary information, which is the tag information corresponding to the first tourism zone in which users have a relatively high degree of interest (long tour time), is transmitted to the staff terminal 500 of the second tourism zone, a staff member in charge of the second tourism zone may identify and supplement factors that may increase a degree of interest of users in a tour through the supplementary information.

The reference information generator 214 may analyze the tag information corresponding to the first tourism zone and the tag information corresponding to the second tourism zone and may generate tag information, which is not present in the tag information corresponding to the first tourism zone among the pieces of tag information corresponding to the second tourism zone, as reference information to transmit the reference information to the staff terminal 500 of a staff member in charge of all tourism zones. The staff member who confirms the reference information may use the reference information to identify factors why users do not have a high degree of interest in a tour, thereby supplementing tourism elements of his or her zone.

The tour route providing apparatus 200 of the present invention may further include a voice data collection unit 215, a voice data classification unit 216, a sentence analysis unit 217, a tourism zone setting unit 218, and a sentence data collection unit 219.

The voice data collection unit 215 may collect voice data of users over time while the users experience a tour using VR data of a tourism area generated through the VR equipment 300. The voice data may be data about a voice that comes out in a process in which users experience VR data.

The voice data classification unit 216 may classify the voice data according to a tourism zone by matching the voice data with tracking data over time. The voice data classification unit 216 may classify voice data through a method of matching a voice, which is spoken by a user while the user tours a specific tourism zone, with the specific tourism zone.

The sentence data collection unit 219 may receive positive sentence data and negative sentence data from a manager terminal to store the positive sentence data and the negative sentence data. The manager terminal may be a terminal used by a manager who manages the tour route providing apparatus 200 of the present invention. During a tour, a manager may determine positive sentence data with a positive meaning and negative sentence data with a negative meaning using his or her own standard, may input the positive sentence data and the negative sentence data to the manager terminal, and may transmit the input positive sentence data and negative sentence data to the sentence data collection unit 219.

The sentence analysis unit 217 may divide the voice data classified according to the tourism zone into units of sentences and may analyze the divided sentences to classify the corresponding sentences into positive sentences, negative sentences, and general sentences. The sentence analysis unit 217 may transmit the classified sentences to the manager terminal, and the manager may check the classified sentences through the manager terminal and then may reclassify the classified sentences. The sentence data collection unit 219 may receive the reclassified positive sentence data and negative sentence data. The sentence analysis unit 217 may learn the positive sentence data and negative sentence data stored by the sentence data collection unit 219 through an artificial intelligence (AI) model and may classify sentences into positive sentences, negative sentences, and general sentences based on learning results.

As such a process is repeated, the accuracy of the sentence analysis unit 217 classifying sentences into positive sentences, negative sentences, and general sentences can be continuously increased.

The tourism zone setting unit 218 may calculate positive and negative ratios of the voice data classified according to the tourism zone based on results analyzed by the sentence analysis unit 217, may set a tourism zone, which includes voice data of which the positive ratio is greater than or equal to a set ratio, as a positive response tourism zone, and may set a tourism zone, which includes voice data of which the negative ratio is greater than or equal to a set ratio, as a negative response tourism zone.

The tour route information generator 207 may include a recommended route determination unit 273 which allocates recommendation scores to the remaining groups of interest, which are left by excluding a group including the negative response tourism region from groups of interest, in order of the larger number of positive response tourism zones, and determines a tour route, which is created from a group with a recommendation score greater than or equal to a set score, as a recommended route. The tour route information generator 207 may transmit information about the recommended route determined by the recommended route determination unit 273 to the corresponding tourism area server 100. In a tourism area, through the tourism area server 100, it is possible to check tourism zone that have positive responses from users using VR, it is also possible to check recommended routes including the corresponding tourism zones, and it is possible to consider providing a travel program using the recommended route to travelers traveling to actual tourism areas.

The tour route providing apparatus 200 of the present invention may further include an opinion exchange server generator 220 and a promotional article data generator 221.

When a negative response tourism zone is included in a group of interest, the opinion exchange server generator may generate an opinion exchange server configured to extract a tourism zone adjacent to the negative response tourism zone from the corresponding group of interest and connect a staff account of the corresponding negative response tourism zone and a staff account of the extracted adjacent tourism zone to allow opinions to be exchanged. The opinion exchange server may be in the form of a chat window through which various types of data may be exchanged.

The opinion exchange server generator 220 may transmit voice data corresponding to the negative reaction tourism zone to the generated opinion exchange server (chat window), and in an opinion server, a staff member of the negative reaction tourism zone and a staff member of the adjacent tourism zone may check the voice data corresponding to the negative reaction tourism zone through his or her staff terminal 500 and may discuss with each other ways to improve responses of users who use the corresponding negative reaction tourism zone.

The promotional article data generator 221 may extract sentences classified to be positive from voice data corresponding to a tourism zone, may generate promotional article data through an article generation model using artificial intelligence based on the extracted sentences, and may transmit the generated promotional article data to the staff terminal 500 of the corresponding tourism zone. In a process of generating the promotional article data, an existing article generation model AI model may be used. The AI model may extract sentences classified to be positive in a specific tourism zone, may use the corresponding sentences to determine a headline and a body, and may generate promotional articles about the tourism zone that correspond to the extracted sentences.

In some cases, the promotional article data may also be transmitted to a manager terminal of the tour route providing apparatus 200 of the present invention, and a manager may finally modify some contents, typos, and the like of the generated promotional article data to transmit the modified promotional article data to the manager terminal. The promotional article data generator 221 may transmit the finally modified promotional article data to the staff terminal 500 of the corresponding tourism zone. The staff terminal 500 of the corresponding tourism zone may use promotional articles about the tourism zone under its jurisdiction as a promotional material for its jurisdiction.

The tour route information generator 207 may further include a headline matching unit 274.

The headline matching unit 274 may extract a headline of promotional articles generated by the promotional article data generator 221 and may match the corresponding headline with a tourism zone included in generated tour route information. The tour route information generator may transmit tour route information, which includes the tourism zone with which the headline matches, to the corresponding tourism area server 100. By receiving tour route information in which a headline, which reflects responses of VR users, matches each tourism zone, in a tourism area, it is possible to secure the reliability of the corresponding tour route information.

As such, according to the present invention, a tour route through which tourists take a tour in an actual tourism area can be provided based on a route, through which users who experience a tourism area implemented in VR move in the tourism area implemented in VR, and a tour time in the tourism area. By receiving the tour route capable of improving tourist satisfaction, in the corresponding tourism area, it is possible to more actively attract tourists to the tourism area thereof, and it is possible to further improve tourism satisfaction by taking a tour through the corresponding tour route of actual tourists.

Furthermore, according to the present invention, by analyzing responses to a tourism zones through voice data during the VR experience of VR users and supplementing tourism zones having negative responses, a tour route with more improved tourist satisfaction can be provided to a tourism area.

The above-described embodiments are for illustrative purposes, and it will be understood by those skilled in the art that the embodiments can be easily modified into other specific forms without changing the technical idea or essential features of the above-described embodiments. Accordingly, it should be understood that the above-described embodiments are exemplary in all respects and not restrictive. For example, each component described to be of a single type can be implemented in a distributed manner. Likewise, components described to be distributed can be implemented in a combined manner.

The scope sought to be protected through the present specification is defined not by the detailed description but by the appended claims, and all modifications or alterations derived from the concept, the range, and the equivalents of the claims will be construed as being included in the scope of the present invention.

What is claimed is:

1. A virtual reality (VR)-based tour route providing apparatus for creating a tour route of a corresponding tourism area through a VR experience in which a tourism area of users is implemented, the VR-based tour route providing apparatus comprising:
an area information receiver configured to receive area information including photo and image data of a tourism area in real time from an area server operated in the tourism area;
a zone information receiver configured to receive zone information including range information of tourism zones included in the tourism area in real time from the area server;
a VR data generator configured to generate VR data in which the tourism area is implemented in VR based on the area information and the zone information;
a tracking data generator configured to generate and store tracking data in which a route, through which users travels, is tracked over time while the users experience a tour using VR data of the tourism area generated through VR equipment;
a zone visit information generator configured to analyze the collected tracking data to calculate the number of visits by the users to the tourism zone and a tour time in the tourism zone and generate tourism zone visit information matching the tourism zone through the number of visits and the tour time;
a zone-of-interest selection unit configured to calculate the number of times, by which the user takes a tour for a set time or more for each zone, based on the tourism zone visit information and select a zone, in which the calculated number of times is greater than or equal to a set number of times, as a zone of interest;
a tour route information generator configured to set a route of a tourism course in the tourism area based on the selected zone of interest and generate tour route information to transmit the generated tour route information to a corresponding tourism area server;
an average tour time calculation unit configured to calculate an average tour time of the users through VR for each tourism zone based on the tourism zone visit information; and
a request time information receiver configured to receive request time information including information about an execution time of a tour route requested in the tourism area from the area server,
wherein, since the zone information and the area information received in real time change, the VR data generator updates the VR data in real time by reflecting changed corresponding information, and
wherein the tour route information generator includes a zone-of-interest grouping unit configured to set a group of interest by combining and grouping selected zones of interest such that a sum of calculated average tour times for each of the selected zones of interest is within a set range of a request time included in the request time information, and a route creation unit configured to create a tour route by connecting adjacent zones of interest among the grouped zones of interest.

2. The VR-based tour route providing apparatus of claim 1, further comprising a tag information receiver configured to receive tag information for representing characteristics of the tourism zone in the form of a hash tag in real time from a staff terminal used by a staff member in the tourism zone,
a first tourism zone extractor configured to extract a tourism zone, in which the average calculation time is greater than or equal to a set time, as a first tourism zone,
a second tourism zone extractor configured to extract a tourism zone, in which the average calculation time is less than the set time, as a second tourism zone,
a supplementary information generator configured to analyze pieces of tag information corresponding to the first tourism zone and pieces of tag information corresponding to the second tourism zone and generate tag information, which is not present in the tag information corresponding to the second tourism zone among the pieces of tag information corresponding to the first tourism zone, as supplementary information to transmit the supplementary information to a staff terminal of a staff member in charge of the second tourism zone, and
a reference information generator configured to analyze the tag information corresponding to the first tourism zone and the tag information corresponding to the second tourism zone and generate tag information, which is not present in the tag information corresponding to the first tourism zone among the pieces of tag information corresponding to the second tourism zone, as reference information to transmit the reference information to a staff terminal of a staff member in charge of all the tourism zones.

3. The VR-based tour route providing apparatus of claim 2, further comprising a voice data collection unit configured to collect voice data of the users over time while the users experience a tour using the VR data of the tourism area generated through the VR equipment,
a voice data classification unit configured to classify the voice data according to the tourism zone by matching the voice data with the tracking data over time,
a sentence analysis unit configured to divide the voice data classified according to the tourism zone into units of sentences and analyze the divided sentences to classify the sentences into positive sentences, negative sentences, and general sentences, and
a tourism zone setting unit configured to calculate a positive ratio and a negative ratio of the voice data classified according to the tourism zone based on results analyzed by the sentence analysis unit, set a tourism zone, which includes voice data of which the positive ratio is greater than or equal to a set ratio, as a positive response tourism zone, and set a tourism zone, which includes voice data of which the negative ratio is greater than or equal to a set ratio, as a negative response tourism zone,
wherein the tour route information generator further includes a recommended route determination unit configured to allocate recommendation scores to remaining groups of interest, which are left by excluding a group including the negative response tourism zone from groups of interest, in order of the larger number of positive response tourism zones, and determine a tour route, which is created from a group with a recommendation score greater than or equal to a set score, as a recommended route, and
the tour route information generator transmits information about the determined recommended route to the tourism area server.

4. The VR-based tour route providing apparatus of claim 3, further comprising a sentence data collection unit configured to receive positive sentence data and negative sentence data from a manager terminal and store the positive sentence data and the negative sentence data,
  wherein the sentence analysis unit transmits the classified sentences to the manager terminal,
  a manager checks the classified sentences through the manager terminal and then reclassifies the classified sentences,
  the sentence data collection unit receives reclassified positive sentence data and reclassified negative sentence data, and
  the sentence analysis unit learns the positive sentence data and the negative sentence data stored in the sentence data collection unit and classifies sentences into positive sentences, negative sentences, and general sentences based on a learning result.

5. The VR-based tour route providing apparatus of claim 4, further comprising an opinion exchange server generator configured to, when the negative response tourism zone is included in the group of interest, generate an opinion exchange server configured to extract a tourism zone adjacent to the negative response tourism zone from the group of interest and connect a staff account of the negative response tourism zone and a staff account of the extracted adjacent tourism zone to allow opinions to be exchanged,
  wherein the opinion exchange server generator transmits voice data corresponding to the negative response tourism zone to the generated opinion exchange server.

6. The VR-based tour route providing apparatus of claim 5, further comprising a promotional article data generator configured to extract sentences classified to be positive from the voice data corresponding to the tourism zone, generate promotional article data through an article generation model using artificial intelligence based on the extracted sentences, and transmit the generated promotional article data to a staff terminal of the tourism zone,
  wherein the tour route information generator further includes a headline matching unit configured to extract a headline of promotional articles generated by the promotional article data generator and match the headline with a tourism zone included in the generated tour route information, and
  the tour route information generator transmits the tour route information, which includes the tourism zone with which the headline matches, to the tourism area server.

* * * * *